(12) United States Patent
Yokota et al.

(10) Patent No.: US 9,283,981 B2
(45) Date of Patent: Mar. 15, 2016

(54) STEERING DEVICE

(71) Applicant: YAMADA MANUFACTURING CO., LTD, Kiryu-shi (JP)

(72) Inventors: Norihiko Yokota, Isesaki (JP); Yoshiyuki Satou, Isesaki (JP); Noriyuki Watanabe, Isesaki (JP)

(73) Assignee: YAMADA MANUFACTURING CO., LTD., Kiryu-shi, Gunma (JP)

( * ) Notice: Subject to any disclaimer, the term of this patent is extended or adjusted under 35 U.S.C. 154(b) by 0 days.

(21) Appl. No.: 13/949,182

(22) Filed: Jul. 23, 2013

(65) Prior Publication Data

US 2014/0026707 A1 Jan. 30, 2014

(30) Foreign Application Priority Data

Jul. 28, 2012 (JP) .................................. 2012-167834

(51) Int. Cl.
*B62D 1/184* (2006.01)
*B62D 1/187* (2006.01)
*B62D 1/18* (2006.01)

(52) U.S. Cl.
CPC *B62D 1/184* (2013.01); *B62D 1/18* (2013.01); *B62D 1/187* (2013.01)

(58) Field of Classification Search
CPC ........... B62D 1/18; B62D 1/184; B62D 1/187
USPC ..................... 280/775, 777; 74/493
See application file for complete search history.

(56) References Cited

U.S. PATENT DOCUMENTS

| 8,550,497 B2* | 10/2013 | Takezawa et al. ............ 280/775 |
| 2009/0044657 A1* | 2/2009 | Osawa et al. .................. 74/493 |
| 2010/0242662 A1* | 9/2010 | Hirooka et al. ................ 74/493 |
| 2011/0175335 A1* | 7/2011 | Takezawa et al. ............ 280/775 |
| 2012/0198956 A1* | 8/2012 | Takezawa et al. ............ 74/493 |

FOREIGN PATENT DOCUMENTS

| JP | 2002-048178 A | 2/2002 |
| JP | 2011-168265 A | 9/2011 |

OTHER PUBLICATIONS

Japanese Office Action dated Apr. 20, 2015.

* cited by examiner

*Primary Examiner* — Barry Gooden, Jr.
(74) *Attorney, Agent, or Firm* — McGinn IP Law Group PLLC

(57) ABSTRACT

A steering device includes: a column pipe; an outer housing having a clamping portion; a pair of stopper plates; a fastener having a bolt shaft that is mounted on the clamping portion so as to fasten the clamping portion to thereby fix the column pipe; and a buffer member. The buffer member is mounted on any one of the pair of facing stopper plates and the bolt shaft and makes contact with the other by mutual displacement, and a plurality of projection ribs having a triangular cross-sectional shape is formed on a contacting surface of the buffer member.

8 Claims, 9 Drawing Sheets

Fig.1A
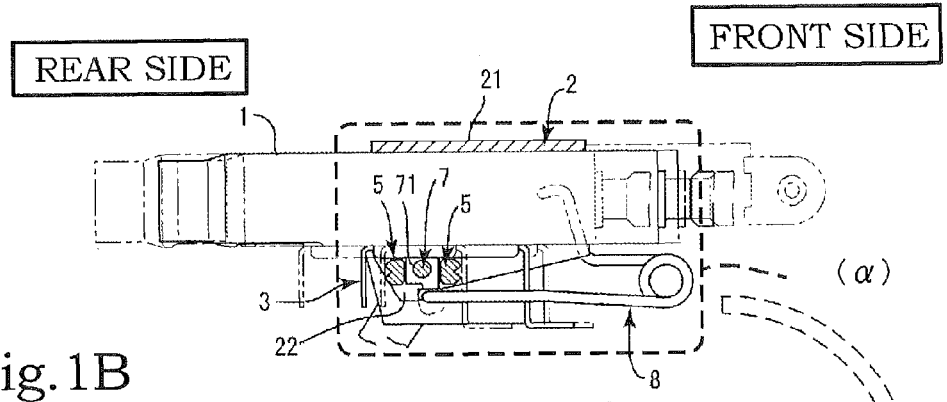
Fig.1B
ENLARGED VIEW OF (α) PORTION
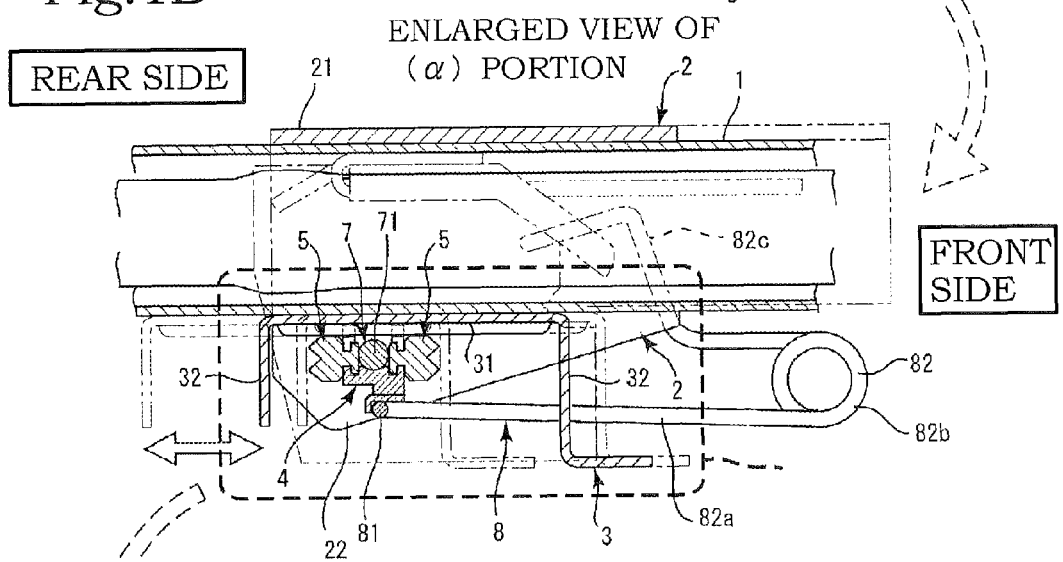
ENLARGED VIEW OF (β) PORTION
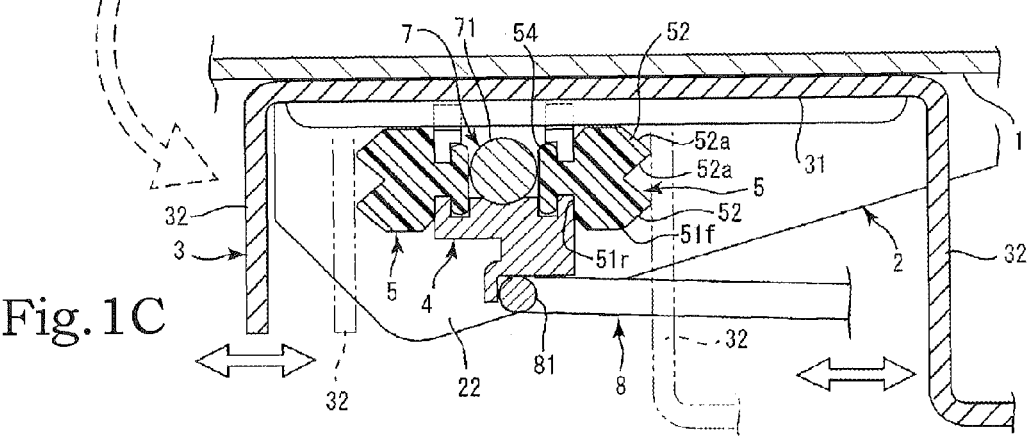
Fig.1C Fig.2B
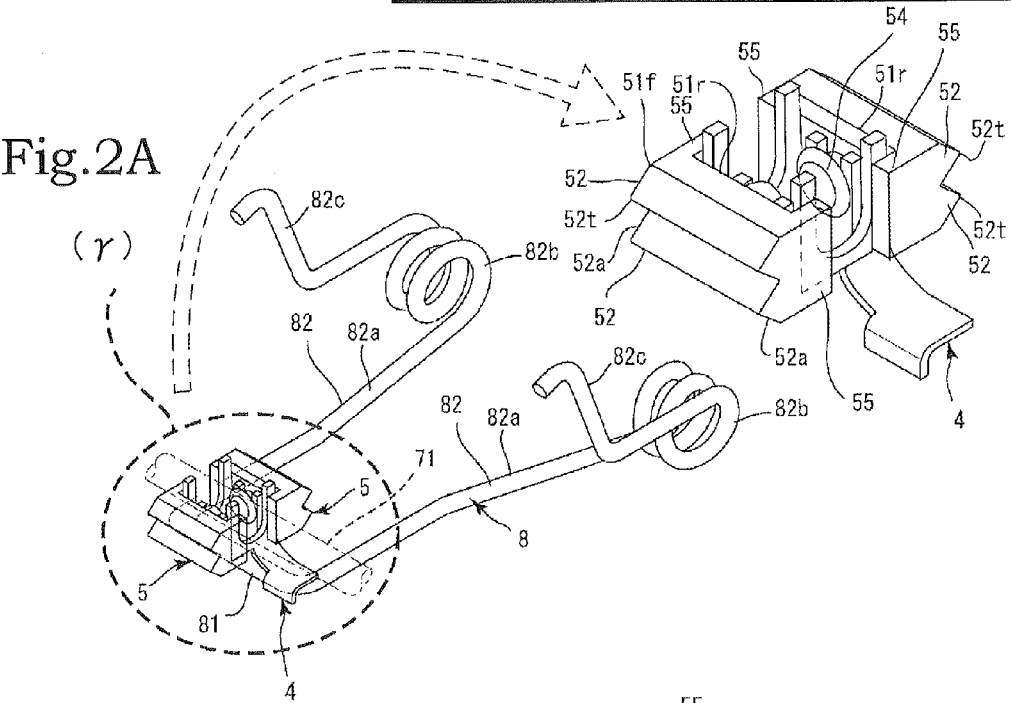
Fig.2A
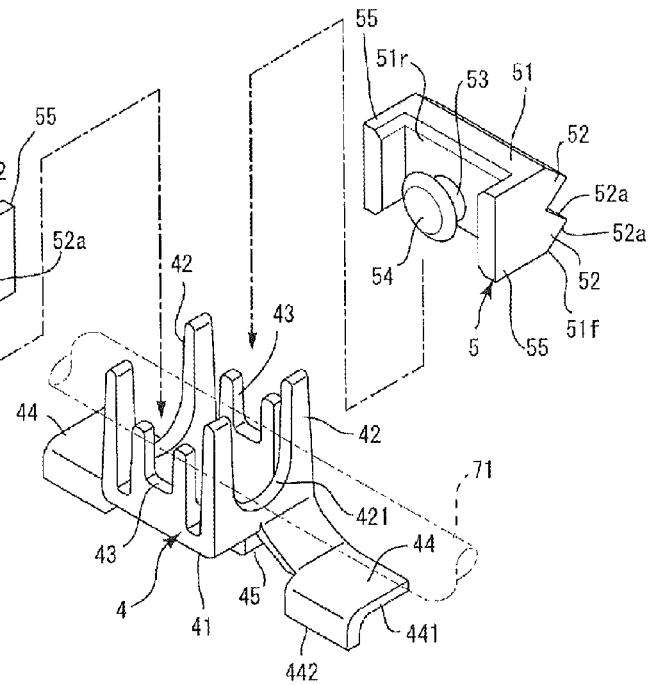
Fig.2C

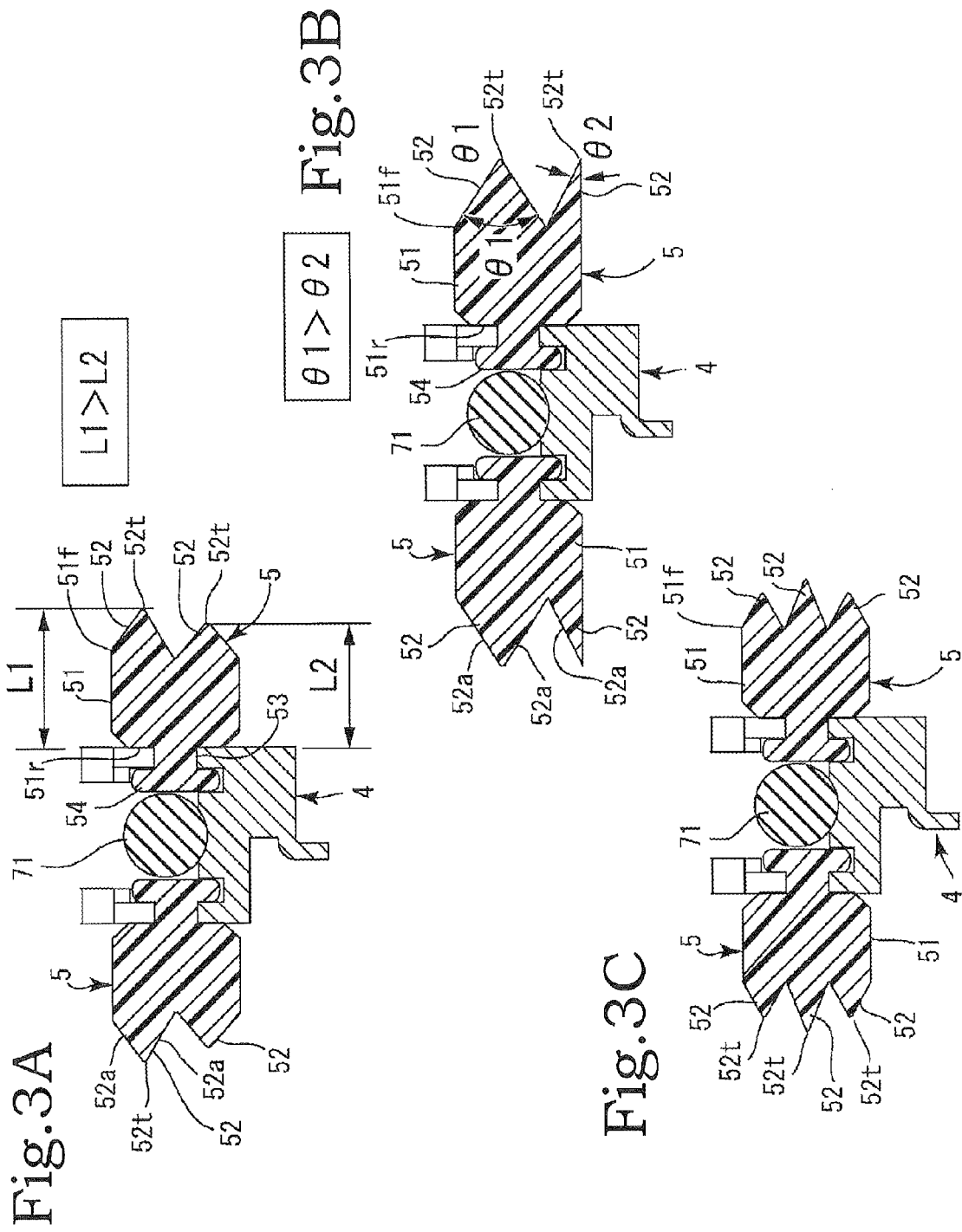

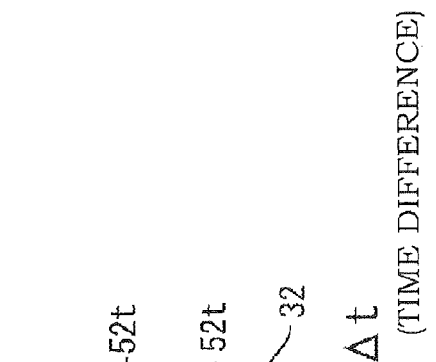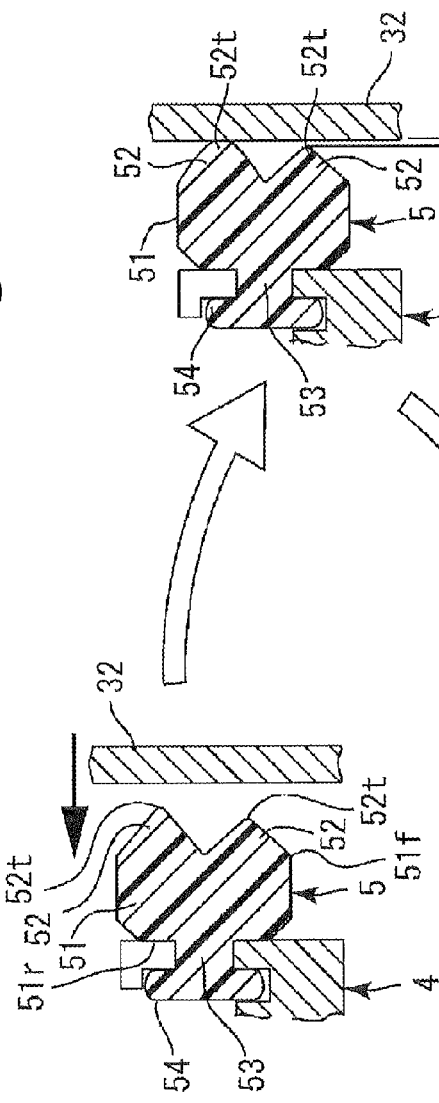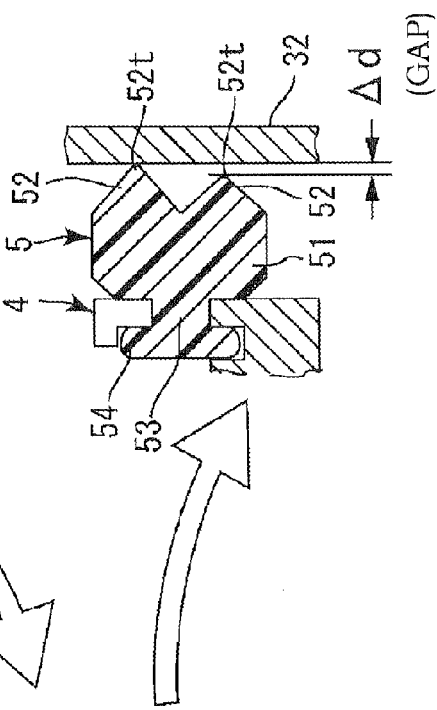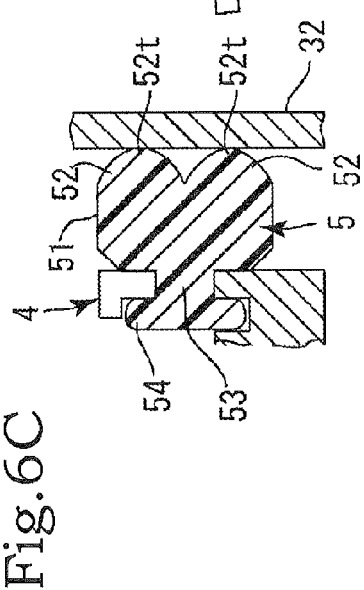

VIEW ALONG ARROW X1-X1

VIEW ALONG ARROW Y1-Y1

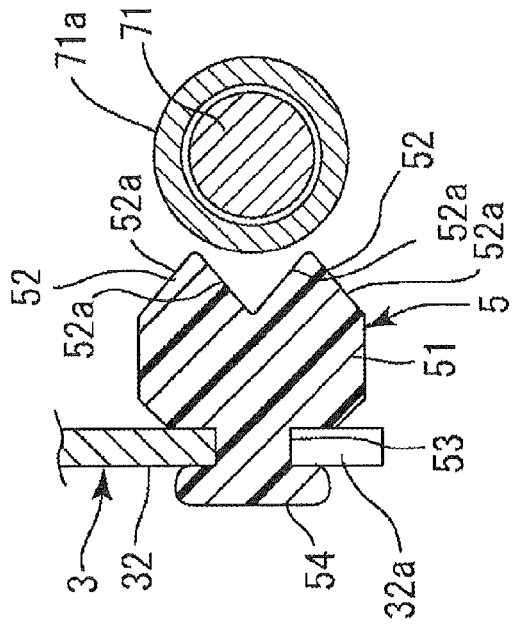
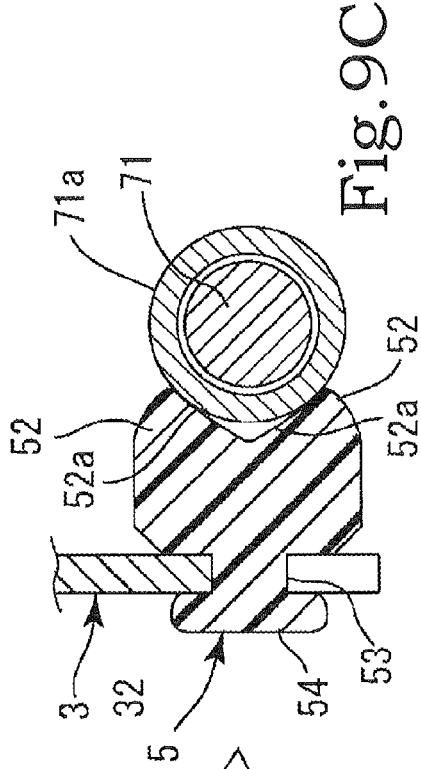
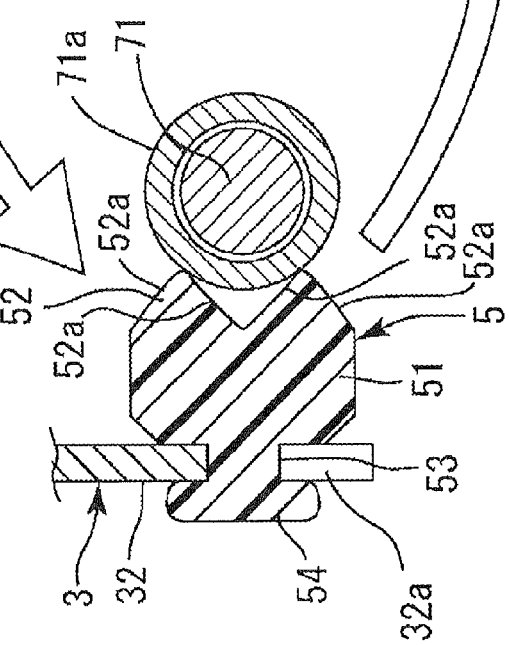

STEERING DEVICE

BACKGROUND OF THE INVENTION

1. Field of the Invention

The present invention relates to a steering device that includes a tilt and telescopic adjustment mechanism and that is capable of preventing a buffer member that absorbs impact from making contact with a metal member that forms a fastener performing locking and unlocking during the tilt and telescopic adjustment for a long period to be pressure-welded to the metal member to cause a problem in the tilt and telescopic adjustment operation.

2. Description of the Related Art

The present applicant has developed various structures of a steering device having a tilt and telescopic adjustment mechanism, for absorbing impact caused by contacting between members during the tilt and telescopic adjustment to reduce impact and impact sound. As an example, Japanese Patent Application Publication No. 2011-168265 discloses a steering device. Members associated with the tilt and telescopic adjustment mechanism include a fastener that includes a bolt shaft and the like, a buffer member for reducing impact, and other members.

In the steering device disclosed in Japanese Patent Application Publication No. 2011-168265, two buffer members 5 formed of elastic rubber are mounted on a slide guide 4, and the slide guide 4 is mounted so as to surround a bolt shaft 71 of a fastener 7. On the other hand, a stopper bracket 3 includes a movable guide portion 31 and stopper plates 32 formed at both ends in a front-rear direction of the movable guide portion 31. The stopper bracket 3 is attached to a lower end position in a radial direction of a column pipe 1 and moves in the front-rear direction in relation to an outer housing 2 together with the column pipe 1 during telescopic adjustment.

During telescopic adjustment, the column pipe 1 moves in an axial direction in relation to the outer housing 2. In this case, any one of both stopper plates 32 of the stopper bracket 3 fixed to the column pipe 1 makes contact with the buffer member 5 to perform a role of a stopper that restricts a telescopic adjustment range.

In the steering device disclosed in Japanese Patent Application Publication No. 2011-168265, even when the column pipe 1 is expanded or contracted in its maximum or minimum limit, the buffer member 5 makes contact with the stopper plate 32 of the stopper bracket 3. Moreover, a contacting surface of the buffer member 5 making contact with the stopper plate 32 is configured as a concave circular arc-shaped surface. When the buffer member 5 and the stopper plate 32 make contact with each other, the contact starts with point-contact or a line-contact and gradually changes to surface-contact.

Due to this, even when the buffer member 5 and the stopper plate 32 collide strongly with each other until the contact becomes approximately surface-contact, the contacting is completed while the buffer member 5 absorbs impact, and the durability of the buffer member 5 can be secured sufficiently.

The telescopic adjustment range is formed with a certain degree of margin, and it is not common for a steering wheel to be used in the limit range of telescopic adjustment. However, for drivers, there may be often a case where any one of the positions at which the column pipe 1 is expanded or contracted in its maximum and minimum limit is the optimum position of the steering wheel. In this case, an automobile is driven in a state where the buffer member 5 is in contact with the stopper plate 32.

Even when the contacting surface of the buffer member 5 is configured as a concave circular arc-shaped surface, if the contact state continues for a long period, the circular arc-shaped surface is gradually deformed into a flat surface, and the buffer member 5 and the stopper plate 32 make surface-contact. Moreover, due to a long period of the surface-contact, the buffer member 5 and the stopper plate 32 are pressure-welded.

SUMMARY OF THE INVENTION

Thus, there is a problem in that, when a driver performs another telescopic adjustment, the buffer member 5 is removed from the slide guide mounted on the fastener. Therefore, an object of the present invention is to solve the above problem while sufficiently taking advantages of Japanese Patent Application Publication No. 2011-168265.

As a result of intensive studies to solve the above problems, the present inventor solved the problems by providing, as a first aspect, a steering device including: a column pipe; an outer housing having a clamping portion that slidably clamps the column pipe; a pair of stopper plates that faces each other and is mounted on the column pipe at a predetermined interval in an axial direction thereof; a fastener having a bolt shaft that is mounted on the clamping portion so as to fasten the clamping portion to thereby fix the column pipe; and a buffer member, wherein the buffer member is mounted on any one of the pair of facing stopper plates and the bolt shaft and makes contact with the other by mutual displacement, and a plurality of projection ribs having a triangular cross-sectional shape is formed on a contacting surface of the buffer member.

A second aspect solves the problems by the steering device according to the first aspect, in which a continuous direction where the projection ribs of the buffer member are arranged continuously is set as a horizontal direction. A third aspect solves the problems by the steering device according to the first aspect, in which a continuous direction where the projection ribs of the buffer member are arranged continuously is set as a vertical direction. A fourth aspect solves the problems by the steering device according to any one of the first to third aspects, in which the projection ribs of the buffer member respectively have different amounts of protrusion. A fifth aspect solves the problems by the steering device according to any one of the first to fourth aspects, in which apex angles of the projection ribs of the buffer member are different from each other. A sixth aspect solves the problems by the steering device according to any one of the first to fifth aspects, in which the buffer member is mounted on the bolt shaft of the fastener. A seventh aspect solves the problems by the steering device according to any one of the first to fifth aspects, in which the buffer member is mounted on the stopper plate.

In the first aspect of the present invention, a plurality of projection ribs having a triangular cross-sectional shape is formed on the contacting surface of the buffer member. Thus, when the bolt shaft that forms the fastener makes contact with any one of the pair of facing stopper plates, the projection ribs prevent the bolt shaft from making surface-contact with the stopper plate.

Due to this, during telescopic adjustment, even when the telescopic adjustment range is adjusted to its maximum range, and the bolt shaft and the stopper plate are in a contact state for a long period, the buffer member and the stopper plate or the buffer member and the bolt shaft may not be pressure-welded. When another telescopic adjustment is performed, the buffer member and the stopper plate or the buffer member and the buffer member can be easily separated, and the buffer member is prevented from being removed from a state of being mounted on a predetermined portion.

Further, the projection ribs of the buffer member have a triangular cross-sectional shape. Thus, when the distal ends which are the angular portions of the projection ribs make contact with the stopper plate, the bolt shaft, or the like during telescopic adjustment, the distal ends of the projection ribs can be easily elastically deformed because the volume and the thickness of the distal ends are small. Therefore, the buffer member gradually absorbs impact from the distal ends that make contact with the stopper plate or the bolt shaft, and the occurrence of metallic sound can be prevented.

In the second aspect of the present invention, since the projection ribs of the buffer member are formed so that the continuous direction (longitudinal direction) is set as the horizontal direction so as to make contact with the stopper plate, it is possible to prevent the projection ribs from being pressure-welded to the stopper plate as described above. Moreover, when the projection ribs make contact with the bolt shaft, the axial direction of the bolt shaft is identical to the continuous direction (longitudinal direction) of the projection ribs, and the projection ribs adjacent in the up-down direction form a groove having a triangular cross-sectional shape. When the bolt shaft is inserted in the groove-shaped portion, the bolt shaft makes contact with both inclined surfaces in an inclined state.

In this case, the impact resulting from the contacting is reduced, and the bolt shaft does not reach the bottom portion of the groove having a triangular cross-sectional shape. Even when the bolt shaft is in contact with the buffer member for a long period, they will not be pressure-welded, and the buffer member is prevented from being removed from a predetermined mounting position during another telescopic adjustment.

In the third aspect of the present invention, since the projection ribs of the buffer member is formed so that the continuous direction (longitudinal direction) is set as the vertical direction, the buffer member is mounted on the stopper plate. When the buffer member and the bolt shaft are configured to make contact with each other during telescopic adjustment, the axial direction of the bolt shaft is perpendicular to the continuous direction (longitudinal direction) of the projection ribs of the buffer member. Approximately similarly to the case where the buffer member and the stopper plate make contact with each other, with a configuration in which the distal ends of the projection ribs are elastically deformed, it is possible to absorb impact resulting from the contact between the buffer member and the bolt shaft.

In the fourth aspect of the present invention, the projection ribs of the buffer member respectively have different amounts of protrusion. When the buffer member and the stopper plate are configured to make contact with each other during telescopic adjustment, a time difference occurs between the respective projection ribs being in contact with the stopper plate, which makes it possible to absorb impact in a stepwise manner and to alleviate impact.

In the fifth aspect of the present invention, apex angles of the projection ribs of the buffer member are different from each other. The volume, thickness, and the like of the distal ends of the projection ribs change, and it is possible to match the magnitude of changing impact according to the weight of the column pipe or the weight or the like of the other members.

In the sixth aspect of the present invention, the buffer member is configured to be mounted on the bolt shaft of the fastener. Thus, the buffer member makes contact with the stopper plate, the buffer member and the stopper plate will not be pressure-welded, and telescopic adjustment can be stabilized. In the seventh aspect of the present invention, since the buffer member is mounted on the stopper plate, the buffer member and the bolt shaft will not be pressure-welded, and telescopic adjustment can be stabilized.

BRIEF DESCRIPTION OF THE DRAWINGS

FIG. 1A is a vertical cross-sectional side view of a principal part of the present invention, FIG. 1B is an enlarged cross-sectional view of a portion (hereinafter referred to as "($\alpha$)-portion") indicated by "($\alpha$)" in FIG. 1A, and FIG. 1C is an enlarged view of a portion (hereinafter referred to as "($\beta$)-portion") indicated by "($\beta$)" in FIG. 1B;

FIG. 2A is a perspective view of a structure in which a buffer member, a slide guide, and an elastic pressing member are assembled together according to an embodiment where a direction (longitudinal direction) in which projection ribs are continuously arranged is set to a horizontal direction, FIG. 2B is an enlarged view of a portion (hereinafter referred to as "($\gamma$)-portion") indicated by "($\gamma$)", and FIG. 2C is an exploded perspective view of the buffer member and the slide guide;

FIG. 3A is a vertical cross-sectional side view showing a state where a buffer member having projection ribs with different amounts of protrusion is mounted on a bolt shaft with a slide guide interposed, FIG. 3B is a vertical cross-sectional side view showing a state where a buffer member having projection ribs with different apex angles is mounted on a bolt shaft with a slide guide interposed, and FIG. 3C is a vertical cross-sectional side view showing a state where a buffer member having three projection ribs is mounted on a bolt shaft with a slide guide interposed;

FIGS. 6A to 6D are vertical cross-sectional side views showing a process wherein a buffer member having projection ribs with different amounts of protrusion comes into contact with a stopper plate;

FIGS. 9A to 9C are vertical cross-sectional side views showing a process wherein a buffer member comes into contact with a stopper plate in an embodiment where the buffer member is mounted on the stopper plate.

DESCRIPTION OF THE PREFERRED EMBODIMENTS

Figure 4A:
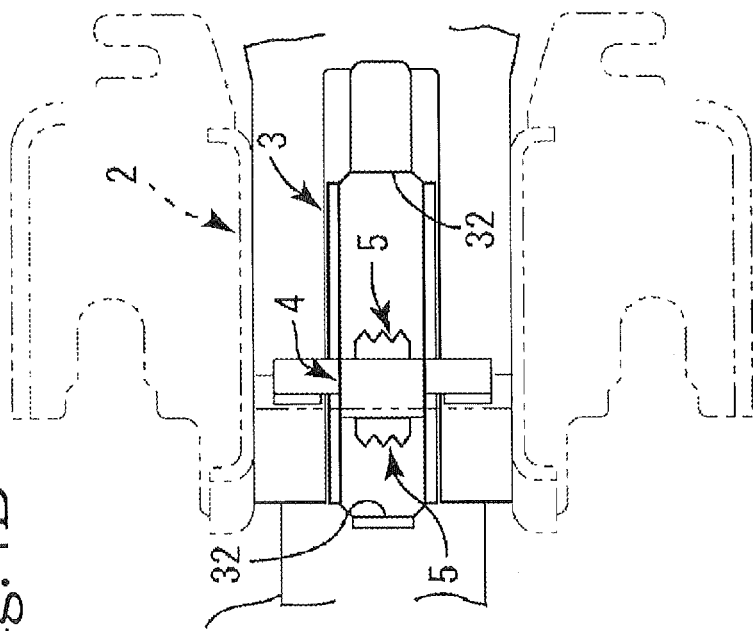
FIG. 4A is a perspective view of a buffer member according to an embodiment where a direction (longitudinal direction) in which projection ribs are continuously arranged is set to a vertical direction.

Hereinafter, embodiments of the present invention will be described with reference to the drawings. As shown in FIGS. 1A to 1C, FIGS. 7A to 7C, and other figures, a steering device according to the present invention mainly includes a column pipe 1, an outer housing 2, a stopper bracket 3, a slide guide 4, a buffer member 5, a fixed bracket 6, a fastener 7, and an elastic pressing member 8. Here, a front-rear direction of the steering device is a direction based on a front-rear direction of an automobile in a state where the steering device is mounted on the automobile.

In the present invention, when the fastening (lock) of the fastener 7 is released (unlocked), the column pipe 1 and the stopper bracket 3 fixed to the column pipe 1 are freely movable in the front-rear direction (axial direction) in relation to the outer housing 2.

The slide guide 4 is mounted on a bolt shaft 71 of the fastener 7 inserted into a fitting hole 221 that is formed in the outer housing 2 described later so as to support the bolt shaft 71. Thus, the slide guide 4 does not move in the front-rear direction but is immovable. The slide guide 4 is in contact with a movable guide portion of the stopper bracket 3. Moreover, a steering shaft is mounted on the column pipe 1 so as to be freely rotatable in a circumferential direction.

The outer housing 2 is mainly formed of an aluminum alloy, and as shown in FIGS. 1A to 1C, FIGS. 7A to 7C, and other figures, includes mainly a clutch portion 21 and two clamping portions 22. Further, the clutch portion 21 includes a clutch body 211 and a separation gap portion 212. The clutch body 211 is a portion that is formed in an approximately hollow cylindrical form and that performs a role of clutching the column pipe 1. The clutch body 211 is formed to be slightly larger than the outer diameter of the column pipe 1. The separation gap portion 212 is formed on the lower side in the radial direction of the clutch body 211.

The separation gap portion 212 is a portion which is separated from the entire portion (or approximately the entire portion) of the clutch body 211 extending from the front side in the axial direction to the rear side and which is formed in an approximately slit shape that extends in the axial direction of the clutch body 211. Two clamping portions 22 are formed in a lower portion of the clutch portion 21 at both edges of the separation gap portion 212. The clamping portion is formed in an approximately rectangular parallelepiped lump (block) form (see FIG. 7C).

Fastening holes 221 are formed in both clamping portions 22 so as to extend in a direction perpendicular to the front-rear direction of the outer housing 2 and in a width direction of the clutch body 211. The bolt shaft 71 of the fastener 7 is inserted into the fastening holes 221 described later.

Figure 7A:
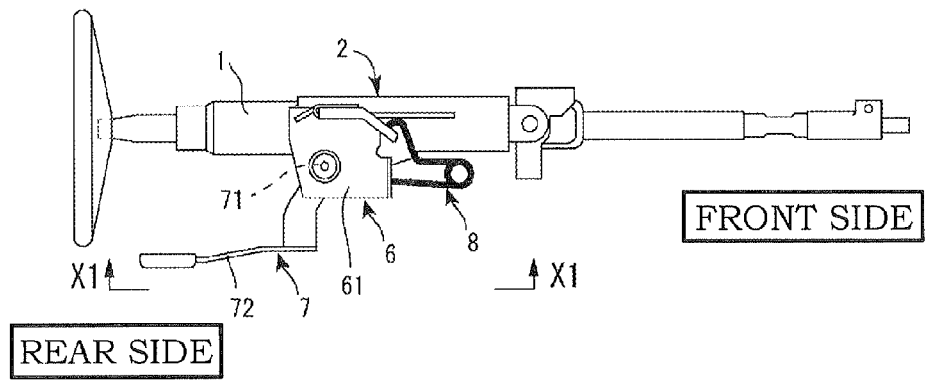
FIG. 7A is a side view showing an entire surface of a steering device according to the present invention.
Figure 7B:
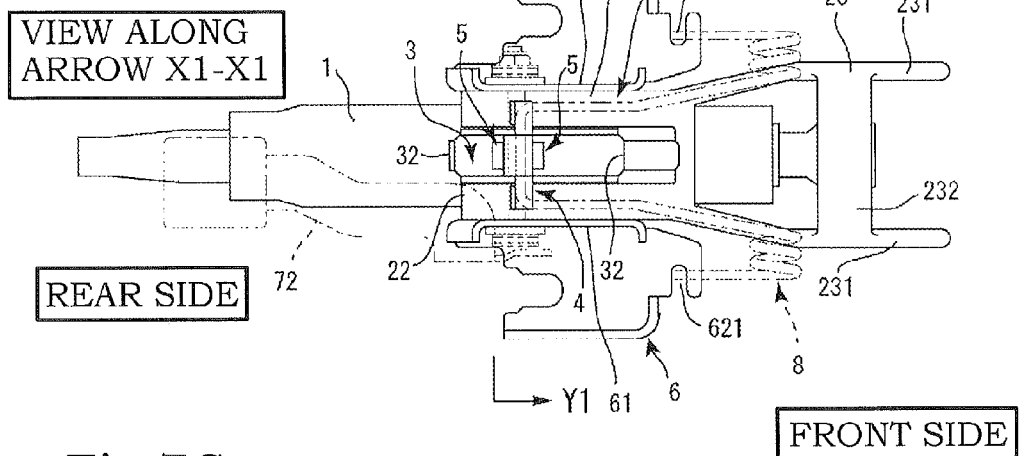
FIG. 7B is a view taken along arrow X1-X1 in FIG. 7A.

As shown in FIG. 7B, an arm portion 23 that includes two arm-shaped portions 231 and a shaft support portion 232 is formed on the front side in the front-rear direction of the clutch portion 21. A bearing is mounted on the shaft support portion 232.

As shown in FIGS. 1A to 1C, the stopper bracket 3 includes a movable guide portion 31 and stopper plates 32 formed at both ends in the front-rear direction of the movable guide portion 31. Both stopper plates 32 are paired in a state of facing each other. The stopper bracket 3 is mounted on a lower end position in the radial direction of the column pipe 1, and during telescopic adjustment, moves in the front-rear direction in relation to the outer housing 2 together with the column pipe 1.

The amount of movement in the front-rear direction during telescopic adjustment is controlled by the length (that is, the gap between both stopper plates 32) in the front-rear direction of the stopper bracket 3. Due to such a configuration, it is possible to appropriately set the gap between a pair of facing stopper plates 32 and to increase the degree of freedom in setting the amount of movement in the front-rear direction of the steering wheel during telescopic adjustment. Moreover, the movable guide portion 31 has an elongated plate shape, and by setting the plate length, it is possible to easily set a stopper position during telescopic adjustment.

Figure 4B:
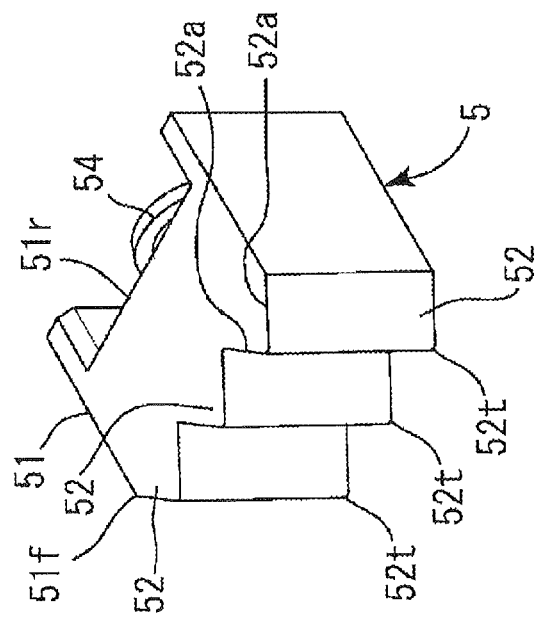
FIG. 4B is a bottom plan view of a principal part of the invention on which the buffer member shown in FIG. 4A is mounted.

The stopper bracket 3 has a portion of the movable guide portion 31 which is fixed by fixing means such as welding to a lower end position in the radial direction of the column pipe 1 and forms a surface having the shape of a recess (part of a circle) that matches the shape of the column pipe 1 (see FIG. 4B).

Both stopper plates 32 are formed in an approximately flat strip form and are formed by being bent at a right angle with respect to the movable guide portion 31. Both stopper plates 32 are set at a right angle with respect to the longitudinal direction of the column pipe 1 in a state where the stopper bracket 3 is fixed to the column pipe 1. That is, both stopper plates 32 are formed to face downward (see FIGS. 1A to 1C).

Figure 8A:
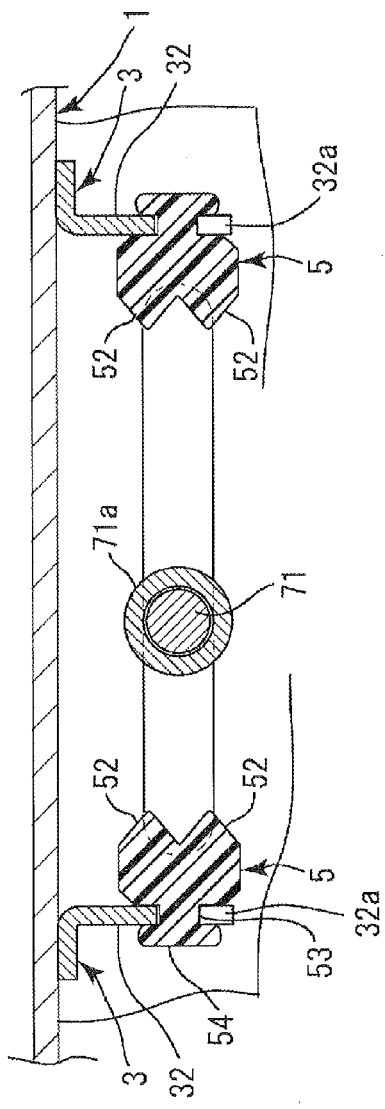
FIG. 8A is a vertical cross-sectional side view of a principal part of an embodiment where a buffer member is mounted on a stopper plate.
Figure 8B:
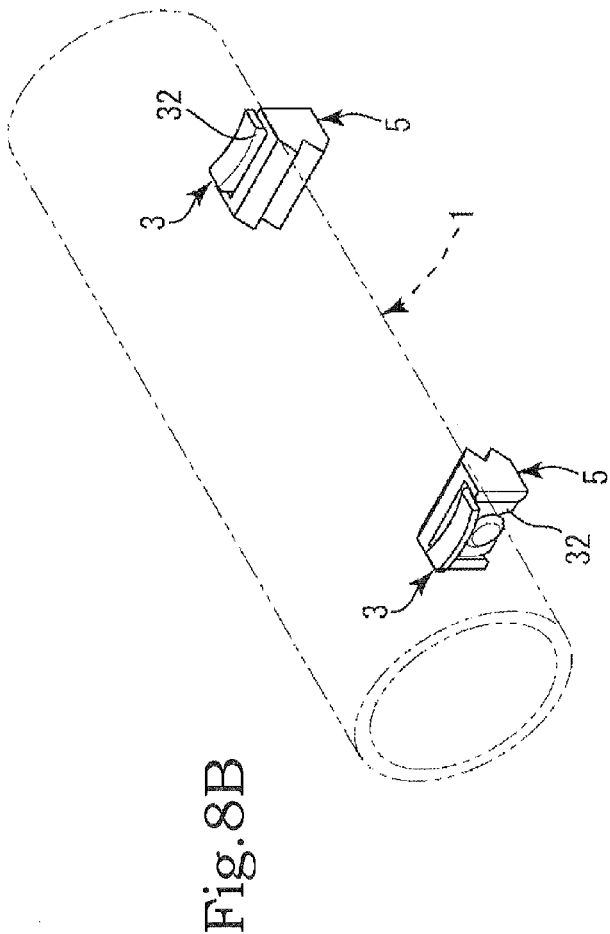
FIG. 8B is a perspective view of a principal part of an embodiment where a buffer member is mounted on a stopper plate.

In another embodiment, the stopper bracket 3 may not have the movable guide portion 31 (see FIGS. 8A and 8B). In this case, the stopper bracket 3 includes only a pair of stopper plates 32 that faces each other, and both stopper plates 32 are independent separate members. Moreover, the respective stopper plates 32 are fixed by fixing means such as welding to a lower end position in the radial direction of the column pipe 1 (see FIG. 8A).

The slide guide 4 performs a role of an interposing member that allows the buffer member 5 described later to be mounted on the bolt shaft 71 of the fastener 7. The slide guide 4 includes a base 41, fixing guide portions 42, and buffer mounting portions 43. The fixing guide portions 42 and the buffer mounting portions 43 each are formed on the base 41 so as to face each other (see FIG. 2C).

Further, pressed portions 44 are formed on the base 41. The base 41 is formed in a quadratic shape such as an approximately rectangular shape or a square shape. The slide guide 4 is particularly formed of a synthetic resin and preferably has a certain degree of elasticity while having a certain degree of structural strength.

The slide guide 4 is mounted on the movable guide portion 31 of the stopper bracket 3 (see FIGS. 2B and 4A). The buffer mounting portions 43 are formed along the front-rear direction of the base 41 of the slide guide 4 so as to face each other. Moreover, the fixing guide portions 42 are formed along the width direction (left-right direction) of the base 41 so as to face each other. The slide guide 4 is configured to elastically bias the stopper bracket 3 toward the upper side while surrounding the bolt shaft 71 of the fastener 7 with the aid of the elastic pressing member 8 described later.

As shown in FIGS. 3B and 3C and other figures, the fixing guide portions 42 are formed in a plate-like shape and form a shaft support portion 421 having an approximately "U"-shaped notch shape. The shaft support portions 421 perform a role of surrounding the bolt shaft 71 of the fastener 7 in the radial direction (that is, the outer circumference of the bolt shaft 71).

The fixing guide portions 42 are formed on the base 41 at a gap that is slightly larger than the diameter of the bolt shaft 71 of the fastener 7. The fixing guide portions 42 have a function of preventing displacement of the bolt shaft 71 of the fastener 7. The buffer member 5 is mounted on the buffer mounting portions 43.

The pressed portions 44 are formed on both sides in the width direction of the base 41. The pressed portion 44 includes a pressed plate 441 and an elastic arm-shaped piece 442. The elastic arm-shaped pieces 442 are formed so as to be tilted slightly downward from both ends in the width direction of the base 41, and the pressed plates 441 are formed to extend from the lower ends of the elastic arm-shaped pieces 442.

The pressed plate 441 is a flat surface, and a locking edge 441a having an approximately vertical plate-like shape is formed at the rear end in the front-rear direction. The pressed plate 441 is a portion that receives an elastic biasing force from a pressing shaft 81 of the elastic pressing member 8 described later. A pressed projection portion 45 is formed on the lower surface of the base 41.

The buffer member 5 is formed of elastic rubber, and as shown in FIGS. 1B and 1C, FIGS. 2B and 2C, and other figures, includes an elastic body 51, a projection rib 52, a neck portion 53, and an attachment expanded portion 54. The elastic body 51 is formed in an approximately flat rectangular parallelepiped shape. The elastic body 51 has a contacting front surface 51f which is mounted on the slide guide 4 so that the surface 51f forms a vertical surface perpendicular to the axial direction of the column pipe 1.

A plurality of projection ribs 52 is formed on the contacting front surface 51f of the elastic body 51. The projection rib 52 is formed in a prismatic shape having a triangular cross-section with two inclined surfaces 52a, and a direction in which the same triangular cross-sections of the projection ribs 52 are arranged continuously is set as a longitudinal direction. The projection ribs 52 are integrally formed on the contacting front surface 51f so that portions corresponding to the apex portion 52t of the triangular cross-sections of the projection ribs 52 protrude in the horizontal direction in a state where the contacting front surface 51f of the elastic body 51 is placed as a vertical surface. The plurality of projection ribs 52 is formed to be parallel (or approximately parallel).

The projection ribs 52 are formed on the contacting front surface 51f of the elastic body 51 so that the continuous direction (that is, the longitudinal direction) is set as a horizontal direction (see FIG. 2C). In a vertical cross-sectional side view perpendicular to the contacting front surface 51f of the buffer member 5, the plurality of projection ribs 52 is formed in an approximately zigzag form or a triangular sawtooth form (see FIGS. 1C, 2B, and 2C). When the continuous direction (longitudinal direction) of the projection ribs 52 is set as the horizontal direction, although two projection ribs 52 are generally formed in the up-down direction, the number is not limited to this, and three projection ribs 52 may be formed in the up-down direction (see FIG. 3C).

In another embodiment, the projection ribs 52 may be formed on the contacting front surface 51f of the elastic body so that the continuous direction (longitudinal direction) is set as the vertical direction (see FIGS. 4A and 4B). That is, in a cross-sectional plan view perpendicular to the contacting front surface 51f of the buffer member 5, a plurality of projection ribs 52 is formed in an approximately zigzag form or a triangular sawtooth form. Although a case where three projection ribs are formed in the up-down direction is illustrated as an embodiment in which the continuous direction (longitudinal direction) of the projection ribs 52 is set as the vertical direction, the number is not limited to this.

As another embodiment, the amounts of protrusion of the plurality of projection ribs 52 from an attachment rear surface 51r of the elastic body 51 may be different from each other. Specifically, when L1 is the larger one of the amounts of protrusion of the projection ribs 52 formed on the contacting front surface 51f from the attachment rear surface 51r of the elastic body 51 and L2 is the smaller one, a relation of L1>L2 is satisfied (see FIG. 3A).

As another embodiment, the plurality of projection ribs 52 may have apex portions 52t respectively having different angles. Specifically, when θ1 is the larger angle of the apex portions 52t of the plurality of projection ribs 52 and θ2 is the smaller angle of the apex portions 52t, a relation of θ1>θ2 is satisfied (see FIG. 3B).

The neck portion 53 is formed to have a circular cross-sectional shape, and the attachment expanded portion 54 is formed in an approximately disk shape or an approximately cylindrical shape. The attachment expanded portion 54 may be recessed in a shape that corresponds to the diameter of the bolt shaft 71 of the fastener 7 described later.

The buffer member 5 is fitted and fixed by mounting the neck portion 53 on the buffer mounting portions 43 of the slide guide 4. The elastic body 51 and the attachment expanded portion 54 perform a role of preventing displacement of the buffer member 5 in the front-rear direction of the slide guide 4. Moreover, holding pieces 55 are formed on both ends in the width direction of the elastic body 51 of the buffer member 5 closer to the attachment rear surface 51r. Both holding pieces 55 clamp the fixing guide portions 42 in a state where the buffer member 5 is mounted on the buffer mounting portions 43 of the slide guide 4. Due to this, the buffer member 5 can be stably and strongly mounted on the slide guide 4 (see FIG. 2B).

Two buffer members 5 are mounted on the slide guide 4 (see FIGS. 1B and 1C, FIGS. 2A to 2C, and other figures) and are fixed to the buffer mounting portions 43. The buffer members 5 have both attachment expanded portions 54 that face each other on the base 41.

The fixed bracket 6 includes fixing side portions 61 and an upper surface portion 62. Support holes 611 are formed in the fixing side portions 61. Moreover, a locking hole 621 for attaching the elastic pressing member 8 is formed in the upper surface portion 62. The fixed bracket 6 is configured such that both outer surfaces 22a of the outer housing 2 are clamped by both fixing side portions 61, the positions of the fastening holes 221 are identical to the positions of the support holes 611, and the bolt shaft 71 of the fastener 7 is inserted (see FIG. 7C).

Figure 7C:
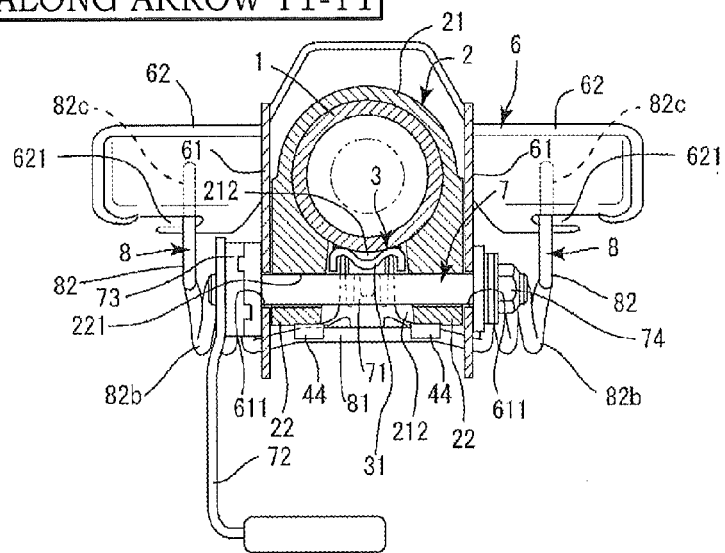
FIG. 7C is a cross-sectional view taken along arrow Y1-Y1 in FIG. 7B.

The fastener 7 includes the bolt shaft 71, a lock lever 72, a fastening cam 73, and a nut 74 (see FIG. 7C). The fastener 7 is mounted by the nut 74 together with the lock lever 72 and the fastening cam 73.

The elastic pressing member 8 has torsion coil springs 82 which are formed from both ends in the width direction so as to extend approximately in the same direction (see FIG. 2A). Specifically, an elastic shaft 82a is formed at an approximately right angle from an axial end of the pressing shaft 81, a coil portion 82b is formed at the other end of the elastic shaft 82a, and a locking shaft 82c is formed at the other end of the coil portion 82b.

The locking shaft 82c is locked and fixed to the upper surface portion 62 of the fixed bracket 6 and elastically biases the pressing shaft 81 toward the upper side with the coil portion 82b interposed. When the elastic pressing member is mounted on the fixed bracket 6, the elastic pressing member 8 approximately bridges or spans across the outer housing 2 so that the pressing shaft 81 presses the slide guide 4 (see FIG. 7C).

The column pipe 1 having the stopper bracket 3 fixed thereto is mounted so that the stopper bracket 3 is accommodated in the separation gap portion 212 when the column pipe 1 is accommodated and mounted on the clutch body 211 of the clutch portion 21 (see FIG. 7C). Thus, the size in the width direction of the stopper bracket 3 is smaller than the nearest gap between both side surfaces of the separation gap portion 212 due to fastening of the fastener 7. Due to this, when the column pipe 1 slides inside the clutch portion 21 during telescopic adjustment or the like, the stopper bracket is restricted so as not to rotate idly in the circumferential direction of the column pipe 1 in the separation gap portion 212.

During telescopic adjustment, due to unlocking of the fastener 7, the column pipe 1 can move for telescopic adjustment in the front-rear direction in relation to the outer housing 2 that is immovable in the front-rear direction. Thus, both stopper plates 32 of the stopper bracket 3 mounted on the column pipe 1 also move in the front-rear direction. Moreover, both stopper plates 32 make contact with the buffer members 5 mounted on the buffer mounting portions 43 of the slide guide 4 that is mounted on the bolt shaft 71 of the fastener 7 (see FIGS. 1A to 1C).

Due to this, when the column pipe 1 moves in the front-rear direction during telescopic adjustment, any one of both stopper plates 32 that move together with the column pipe 1 makes contact with one of the buffer members 5 mounted on the slide guide 4. In this manner, the moving distance of both buffer members 5 mounted on the bolt shaft 71 with the slide guide 4 interposed, moving from the stopper plate 32 on one side (front side) to make contact with the stopper plate 32 on the other side (rear side) is a telescopic adjustment range.

The bolt shaft 71 of the fastener 7 passes through the fastening holes 221 of the outer housing 2, the support holes 611 formed in the fixing side portions 61 of the fixed bracket 6, and the shaft support portions 421 of the fixing guide portions 42 of the slide guide 4.

Figure 5A:
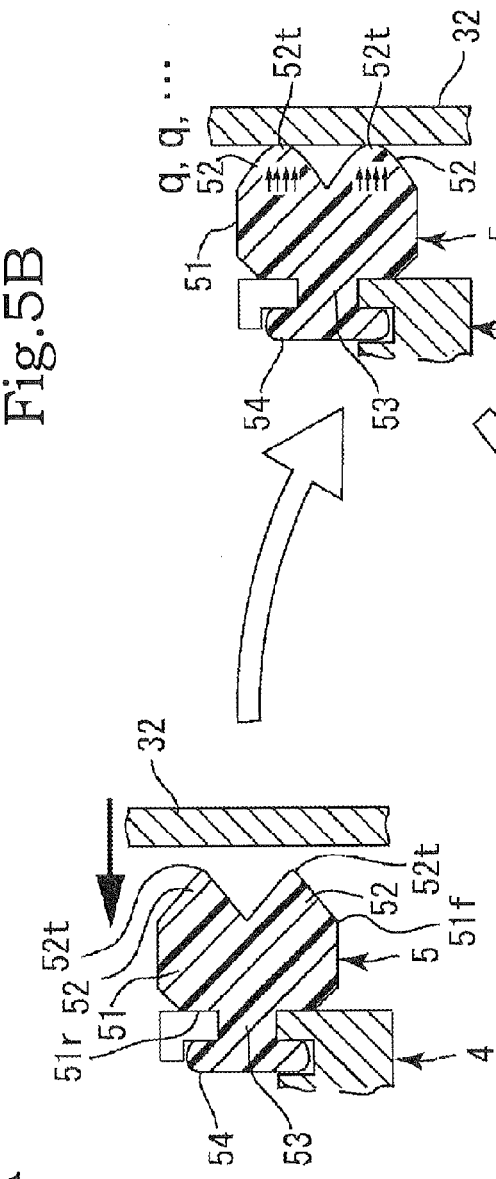
FIGS. 5A to 5D are vertical cross-sectional side views showing a process wherein a buffer member having projection ribs of the same shape comes into contact with a stopper plate.
Figure 5B:
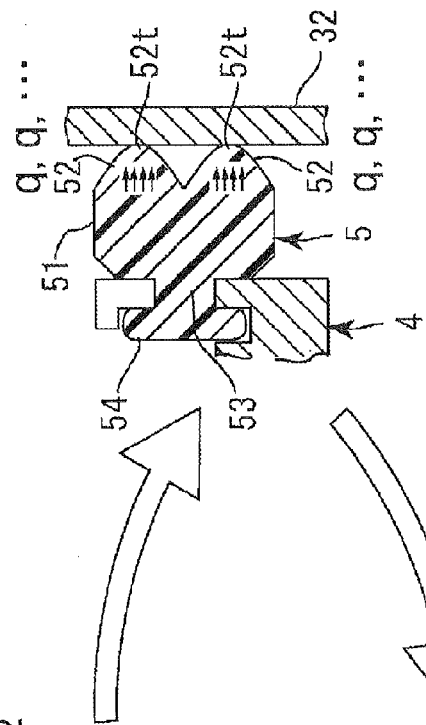

The elastic pressing member 8 is configured so that the pressing shaft 81 elastically biases the slide guide 4 toward the upper side with the aid of the torsion coil springs 82 (see FIG. 5A). That is, the slide guide 4 is pressed against the stopper bracket 3 by the pressing shaft 81 of the elastic pressing member 8. Due to this, when the fastener 7 is unlocked during telescopic adjustment, the column pipe 1 is held at an appropriate position, and the steering wheel can be moved in the front-rear direction in a more stable state.

The buffer member 5 is mounted on the bolt shaft 71 of the fastener 7 with the slide guide 4 interposed as described above. However, in another embodiment, the buffer member 5 may be mounted so as to face the stopper plates 32 of the stopper bracket 3. In this embodiment, contacting front surfaces 51f of both facing stopper plates 32 are provided so as to face each other. That is, projection ribs 52 of both buffer members 5 are provided so as to face each other.

In the embodiment, both facing buffer members 5 move in the front-rear direction together with both stopper plates 32 of the stopper bracket 3 mounted on the column pipe 1. The bolt shaft 71 of the fastener 7 is positioned between both facing buffer members 5. When the column pipe 1 moves in the front-rear direction during telescopic adjustment, any one of both buffer members 5 that move together with the column pipe 1 makes contact with the bolt shaft 71. In this manner, the moving distance of the column pipe 1 moving from the buffer member 5 on one side (front side) to make contact with the buffer member 5 on the other side (rear side) is a telescopic adjustment range.

In the present invention, due to the above configuration, even when the buffer member 5 and the stopper plate 32 of the stopper bracket 3 or the buffer member 5 and the bolt shaft 71 of the fastener 7 are in the contact state for a long period, they will not be pressure-welded to each other, and the buffer member 5 is prevented from being separated from the bolt shaft or the stopper plate 32 during another telescopic adjustment. Moreover, during telescopic adjustment, when the position of the steering wheel is adjusted as much as possible to a maximum contractible extent within the telescopic adjustment range, it is possible to alleviate the impact caused by the contact between the buffer member 5 and the stopper plate 32 and to improve the operation sensitivity of telescopic adjustment.

First, a case where a pair of buffer members 5 is mounted so as to face the bolt shaft 71 of the fastener 7 with the slide guide 4 interposed, and during telescopic adjustment, any one of both buffer members 5 makes contact with any one of the facing stopper plates 32 will be described (see FIGS. 5A to 5D).

During the telescopic adjustment, first, the buffer member 5 mounted on the bolt shaft 71 of the fastener 7 with the slide guide 4 interposed moves toward the buffer member 5 so as to make contact with any one of the pair of facing stopper plates 32 (see FIG. 5A). When or immediately after the stopper plate 32 makes contact with the buffer member 5, the apex portions 52t of the projection ribs 52 of the buffer member 5 are elastically deformed (see FIGS. 5B and 5C). Moreover, the shape of the elastically deformed apex portions 52t is elastically restored immediately, and the projection ribs 52 and the stopper plate 32 make line contact (see FIG. 5D).

Thus, even when during telescopic adjustment, adjustment is performed to maximize the telescopic adjustment range and a state where the buffer member 5 and the stopper plate 32 are in contact for a long period, the buffer member 5 and the stopper plate 32 will not be strongly pressure-welded. Moreover, when telescopic adjustment is performed again, since the buffer member 5 and the stopper plate 32 are pressure-welded in a line-contact state, the bonding force resulting from the pressure-welding is very weak, and they can be easily separated. Moreover, the buffer member 5 is prevented from being removed by being separated from the state of being mounted on the slide guide 4.

Further, the projection ribs 52 of the buffer member 5 are formed to have a triangular cross-sectional shape, and when the distal ends which are the apex portions 52t (angular portions) of the projection ribs 52, the volume and thickness of the projection ribs 52 near the apex portions 52t decrease temporarily when the distal ends make contact with the stopper plate 32 during telescopic adjustment. Thus, the projection ribs 52 are very easily elastically deformed (see FIG. 5B). Thus, immediately after the buffer member 5 makes contact with the stopper plate 32, repulsive force q from the apex portions 52t is also small (see FIG. 5B), and the projection ribs 52 are easily elastically deformed to absorb impact. Moreover, it is possible to completely eliminate or decrease impact sound.

Figure 5C:
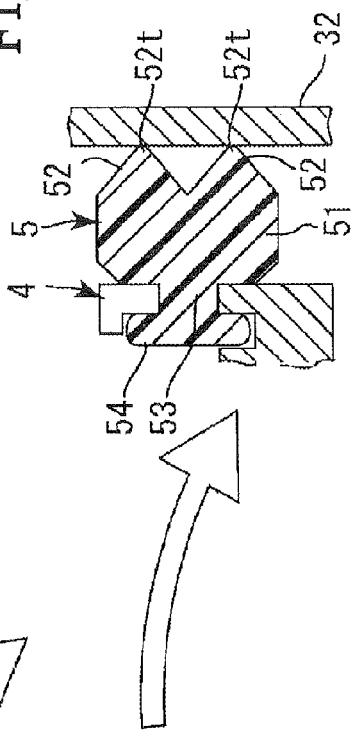
Figure 5D:
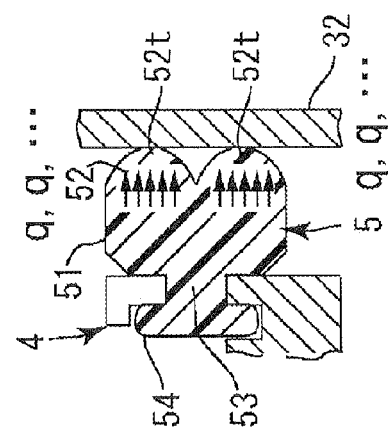

Further, immediately after the projection ribs 52 make contact with the stopper plate 32, although the apex portions 52t are elastically deformed as described above, the amount of elastic deformation of the apex portions 52t increases, and the volume and thickness of the apex portions 52t also increase gradually (see FIG. 5C).

Thus, when and immediately after the projection ribs 52 makes contact with the stopper plate 32, the amount of elastic deformation increases gradually and the repulsive force q resulting from the elasticity also increases (see FIG. 5C), which performs a role of a satisfactory shock absorbing damper. Moreover, even when the apex portions 52t of the buffer member 5 are elastically deformed by the contact between the buffer member 5 and the stopper plate 32, the shape of the area dividing patterns 52t is restored immediately after the contact and the stopper plate 32 stops after moving slightly (see FIG. 5D). Due to these processes, during telescopic adjustment, it is possible to improve the operation sensitivity when the buffer member 5 stops by making contact with the stopper plate 32.

Next, the contacting process according to an embodiment in which the projection ribs 52 of the buffer member 5 respectively have different amounts of protrusion will be described (see FIGS. 6A to 6D). During telescopic adjustment, the stopper plate 32 starts moving closer to the buffer member 5 (see FIG. 6A). Moreover, the apex portion 52t of the projection rib 52 having the largest amount of protrusion first makes contact with the stopper plate 32. In this case, the projection rib 52 having the smaller amount of protrusion is not in contact with the stopper plate 32.

Here, a time difference Δt occurs between the projection rib 52 that is in contact with the stopper plate 32 and the projection rib 52 that is not in contact with the stopper plate 32 (see FIG. 6B). Moreover, the other projection ribs make contact with the stopper plate 32 with the time difference Δt, and as described above, and all projection ribs make contact with the stopper plate 32 while the apex portions 52t of the projection ribs 52 are elastically deformed (see FIG. 6C). Moreover, even when the apex portions 52t of the buffer member 5 are elastically deformed, the shape of the apex portions 52t is restored immediately after the contacting, and the stopper plate 32 stops after moving slightly (see FIG. 6D).

In this manner, it is possible to absorb impact in a stepwise manner and to alleviate impact. Moreover, immediately after the projection ribs 52 of the buffer member 5 make contact with the stopper plate 32, the projection ribs 52 of the buffer member 5 are elastically restored. In this case, some of the restored projection ribs 52 may not be in contact with the stopper plate 32 but a gap Δd is formed, and the projection rib 52 having the largest amount of protrusion makes contact with the stopper plate 32. Thus, only one line contact is created between the buffer member 5 and the stopper plate 32, and it is possible to decrease pressure-welding force between the projection rib 52 and the stopper plate 32 and to further prevent the buffer member 5 from being removed from the bolt shaft 71.

In an embodiment (see FIG. 3B) where the apex portions 52t of the plurality of projection ribs 52 of the buffer member 5 respectively have different angles, the volumes, thicknesses, and the like of the apex portions 52t at the distal ends of the respective projection ribs 52 are different from each other. Thus, it is possible to control the elastic force and the easiness of elastic deformation of the apex portions 52t of the respective projection ribs 52. Therefore, although the impact during telescopic adjustment is different depending on the weight of the column pipe 1 and the weight and the like of the other members, it is possible to match the magnitude of such impact.

Next, a case in which a pair of buffer members 5 is mounted on the stopper plates 32 and the bolt shaft 71 of the fastener 7 makes contact with any one of both buffer members 5 during telescopic adjustment will be described. Here, a fitting groove 32a is formed in the stopper plate 32, and the neck portion 53 of the buffer member 5 is fitted to the fitting groove 32a.

Further both holding pieces 55 of the buffer member 5 can clamp both ends in the width direction of the stopper plate 32 so that the buffer member 5 is stably and strongly mounted on the stopper plate 32. Moreover, during telescopic adjustment, the axial direction of the bolt shaft 71 is identical to the continuous direction (longitudinal direction) of the respective projection ribs 52 (see FIG. 9A).

Moreover, the facing inclined surfaces 52a of the projection ribs 52 adjacent to each other in the up-down direction form a groove having a triangular cross-sectional shape. The outer circumferential side surface of the bolt shaft 71 is inserted into the groove-shaped portion formed by both inclined surfaces 52a. In this state, the outer circumferential side surface of the bolt shaft 71 makes contact, in the horizontal direction, with both inclined surfaces 52a of the projection ribs 52 adjacent to each other in the up-down direction, and the outer circumferential side surface of the bolt shaft 71 is clamped by both inclined surfaces 52a in an inclined state (see FIG. 9B).

Thus, the impact resulting from the contact between the bolt shaft 71 and the buffer member 5 is reduced, and the bolt shaft 71 does not reach the bottom portion of the groove having a triangular cross-sectional shape formed by both inclined surfaces 52a of the projection ribs 52 adjacent to each other in the up-down direction but makes only line-contact with both inclined surfaces 52a. Thus, even when the outer circumferential side surface of the bolt shaft 71 is in contact with the buffer member 5 for a long period, they will not be pressure-welded, and the buffer member 5 is prevented from being removed from the stopper plate 32 during another telescopic adjustment.

As shown in FIGS. 8A and 8B and FIGS. 9A to 9C, a cylindrical collar 71a that forms the bolt shaft 71 may be mounted on the bolt shaft 71. In this case, the collar 71a makes contact with the buffer member 5 as the outer circumferential side surface of the bolt shaft 71.

What is claimed is:

1. A steering device comprising:
   a column pipe;
   an outer housing having a clamping portion that slidably clamps the column pipe;
   a pair of stopper plates that face each other and are mounted on the column pipe at a predetermined interval in an axial direction thereof;
   a fastener having a bolt shaft that is mounted on the clamping portion so as to fasten the clamping portion to thereby fix the column pipe; and
   a buffer member, wherein
   the buffer member is mounted on any one of the pair of facing stopper plates and the bolt shaft and makes contact with the other by mutual displacement,
   a plurality of projection ribs formed in a prismatic shape having a triangular cross-sectional shape with two inclined surfaces are formed on a contacting surface of the buffer member in a zigzag form or in a triangular sawtooth form,
   wherein the plurality of projection ribs of the buffer member respectively have different amounts of protrusion.

2. The steering device according to claim 1, wherein apex angles of the plurality of projection ribs of the buffer member are different from each other.

3. The steering device according to claim 1, wherein the buffer member is mounted on the bolt shaft of the fastener.

4. The steering device according to claim 1, wherein the buffer member is mounted on the pair of stopper plates.

5. A steering device comprising:
   a column pipe;
   an outer housing having a clamping portion that slidably clamps the column pipe;
   a pair of stopper plates that face each other and are mounted on the column pipe at a predetermined interval in an axial direction thereof;
   a fastener having a bolt shaft that is mounted on the clamping portion so as to fasten the clamping portion to thereby fix the column pipe; and
   a buffer member, wherein
   the buffer member is mounted on any one of the pair of facing stopper plates and the bolt shaft and makes contact with the other by mutual displacement, a plurality of projection ribs formed in a prismatic shape having a triangular cross-sectional shape with two inclined surfaces are formed on a contacting surface of the buffer member in a zigzag form or in a triangular sawtooth form,
wherein apex angles of the plurality of projection ribs of the buffer member are different from each other.

6. The steering device according to claim 5, wherein the buffer member is mounted on the bolt shaft of the fastener.

7. The steering device according to claim 5, wherein the buffer member is mounted on the pair of stopper plates.

8. A steering device comprising:
a column pipe;
an outer housing having a clamping portion that slidably clamps the column pipe;
a pair of stopper plates that face each other and are mounted on the column pipe at a predetermined interval in an axial direction thereof;
a fastener having a bolt shaft that is mounted on the clamping portion so as to fasten the clamping portion to thereby fix the column pipe; and
a buffer member, wherein
the buffer member is mounted on any one of the pair of facing stopper plates and the bolt shaft and makes contact with the other by mutual displacement,
a plurality of projection ribs formed in a prismatic shape having a triangular cross-sectional shape with two inclined surfaces are formed on a contacting surface of the buffer member in a zigzag form or in a triangular sawtooth form,
wherein the plurality of ribs respectively include an apex and an elastic head portion, at least one apex being other than extending from an upper surface and a lower surface of the buffer member.

* * * * *